(12) United States Patent
Corghi (10) Patent No.: US 12,344,053 B2
(45) Date of Patent: Jul. 1, 2025

(54) JAW, WHEEL-HOLDER UNIT AND TYRE CHANGING APPARATUS

(71) Applicant: NEXION S.p.A., Correggio (IT)

(72) Inventor: Giulio Corghi, Correggio (IT)

(73) Assignee: NEXION S.p.A., Correggio (IT)

( * ) Notice: Subject to any disclaimer, the term of this patent is extended or adjusted under 35 U.S.C. 154(b) by 514 days.

(21) Appl. No.: 17/482,776

(22) Filed: Sep. 23, 2021

(65) Prior Publication Data

US 2022/0097466 A1 Mar. 31, 2022

(30) Foreign Application Priority Data

Sep. 25, 2020 (IT) ........................ 102020000022699

(51) Int. Cl.
*B60C 25/05* (2006.01)
*B60B 30/06* (2006.01)
*B60C 25/138* (2006.01)

(52) U.S. Cl.
CPC .......... *B60C 25/0539* (2013.01); *B60B 30/06* (2013.01); *B60C 25/0518* (2013.01); *B60C 25/0545* (2013.01); *B60C 25/138* (2013.01)

(58) Field of Classification Search
CPC . B60C 25/0539; B60C 25/0518; B60B 30/06; B60B 30/08
(Continued)

(56) References Cited

U.S. PATENT DOCUMENTS 2,448,881 A * 9/1948 Glynn ...................... B23B 31/18
279/123
6,062,289 A * 5/2000 Cunningham ...... B60C 25/0539
157/14
(Continued)

FOREIGN PATENT DOCUMENTS

CN 110525141 A 12/2019
EP 0042363 A1 12/1981
(Continued)

OTHER PUBLICATIONS

Search Report issued in Italian Application No. 202000022699 dated May 14, 2021.
(Continued)

*Primary Examiner* — Bryan R Muller
(74) *Attorney, Agent, or Firm* — United IP Counselors, LLC (57) ABSTRACT

A jaw (1) for clamping a wheel rim comprises a body (2) extending along a longitudinal orientation (L). The body (2) includes: a connecting portion (22) configured to be connected to the head of the wheel-holder unit; a base portion (21) extending along the longitudinal orientation (L); a first abutment wall (23) extending from the base portion (21) along a clamping orientation (R); a second abutment wall (24) extending from the base portion (21) along the clamping orientation (R) in a spacing-apart direction (VA) and longitudinally spaced from the first abutment wall (23) by a working distance (DL); an abutment surface (251), longitudinally interposed between the first abutment surface (23) and the second abutment surface (24) and including a first portion (251A) and a second portion (251B, 251C), disposed at an advanced position relative to the first portion (251A) in the spacing-apart direction (VA) of the clamping orientation (R) to come into contact with the wheel rim. The second portion is spaced from the first abutment wall (23) along the longitudinal orientation (L) by a first abutment distance (D1), greater than 30% of the working distance (DL).

10 Claims, 5 Drawing Sheets

(58) Field of Classification Search
USPC .............................................. 157/16, 20, 21
See application file for complete search history.

(56) References Cited

U.S. PATENT DOCUMENTS

| | | | |
|---|---|---|---|
| 8,347,934 B1* | 1/2013 | Cunningham | B60C 25/0539 |
| | | | 157/17 |
| 2005/0199349 A1* | 9/2005 | Matteucci | B60C 25/138 |
| | | | 157/16 |
| 2010/0269982 A1* | 10/2010 | Corghi | B60C 25/0545 |
| | | | 157/20 |
| 2016/0176250 A1* | 6/2016 | Hai | B60C 25/0539 |
| | | | 157/14 |

FOREIGN PATENT DOCUMENTS

| | | |
|---|---|---|
| IT | 102017000135329 | 5/2019 |
| WO | 2009015920 A1 | 2/2009 |

OTHER PUBLICATIONS

Written Opinion issued in Italian Application No. 202000022699 dated May 14, 2021.

* cited by examiner

JAW, WHEEL-HOLDER UNIT AND TYRE CHANGING APPARATUS

CROSS-REFERENCE TO RELATED APPLICATIONS

This application claims priority to, and the benefit of, Italian Patent Application No. 102020000022699, filed on Sep. 25, 2020, the contents of which are incorporated by reference herein in their entirety.

TECHNICAL FIELD

This disclosure relates to a jaw for a wheel-holder unit. Preferably, the wheel-holder unit is implemented in a tyre changing apparatus.

BACKGROUND

The wheel-holder unit of a tyre changing apparatus is configured to hold the wheel firmly by its rim while the tyre is being mounted on, or removed from, the wheel.

The wheel-holder unit comprises a rotation head which turns about an axis of rotation to impart rotation to the wheel mounted on it. The rotation head comprises a plurality of jaws which are movable towards and away from each other between a clamped position, where they are in contact with the wheel rim, and a rest position, where they are closer together and spaced from the wheel rim.

Each jaw comprises a special profile with which a specific flange of the wheel rim comes into contact in the clamped position. The profile includes an inclined wall which comes into abutment against the flange. The inclined wall extends from a first end, in contact with a first abutment wall, to a second end, in contact with a second abutment wall. Therefore, the distance between the first abutment wall and the second abutment wall defines a maximum thickness of a flange that can be held by the jaw.

Examples of jaws are provided by patent document IT102017000135329, in the name of the present Applicant, and by patent documents US2005/199349 and EP0042363.

Having to limit the dimensions along the axis of rotation of the head means that the prior art jaws can handle a limited range of rim flange thicknesses, which in turn reduces their flexibility of use. Other examples of jaws are described in the following documents: WO2009015920A1 by the same Applicant and CN110525141A. These documents all describe jaws that lack flexibility with respect to flanges that are processable.

BRIEF SUMMARY

This disclosure has for an aim to provide a jaw, a wheel-holder unit, a tyre changing apparatus and a method for mounting or demounting a tyre on or from a wheel rim to overcome the abovementioned disadvantages of the prior art.

This aim is fully achieved by the jaw, the wheel-holder unit, the tyre changing apparatus and the method of this disclosure as characterized in the appended claims.

According to an aspect of it, this disclosure provides a jaw for clamping a wheel rim in a tyre changing apparatus provided with a wheel-holder unit having a head.

The jaw comprises a body. The body has an elongate shape extending along a longitudinal orientation.

The body includes a connecting portion, configured to be connected to the head of the wheel-holder unit. The body comprises a base portion extending along the longitudinal orientation.

The body comprises a first abutment wall. The abutment wall extends from the base portion along a clamping orientation, perpendicular to the longitudinal orientation. The abutment wall extends in a spacing-apart direction (or abutting direction or clamping direction). The abutment wall extends along a transverse orientation. The transverse orientation is perpendicular to the longitudinal orientation and to the damping orientation.

The body comprises a second abutment wall. The second abutment wall extends from the base portion along the damping orientation in the spacing-apart direction. In other words, the first and the second abutment wall extend from the base portion in the same direction along the damping orientation. The second abutment wall extends along the transverse orientation. The second abutment wall is longitudinally spaced from the first abutment wall. The abutment walls are configured to come into contact with the wheel rim.

The body comprises an abutment surface. The abutment surface is longitudinally interposed between the first and the second abutment wall. The abutment surface is smoothly connected to the first and the second abutment wall to delimit the body, in the spacing-apart direction, between the first and the second abutment wall. In other words, the abutment surface is configured to come into abutment against a flange of the wheel rim, in a connecting zone interposed between the first and the second abutment wall.

In an embodiment, the abutment surface comprises a first portion. The first portion is smoothly connected to the first abutment wall. The abutment surface comprises a second portion. The second portion is smoothly connected to the second abutment wall.

The second portion is inclined relative to the first portion.

The second portion of the abutment surface is located at an advanced position relative to the first portion in the spacing-apart direction of the clamping orientation, to come into contact with the wheel rim.

The first and the second abutment wall are spaced apart by a working distance along the longitudinal orientation.

The second portion of the abutment surface is spaced from the first abutment wall by a first abutment distance. In an embodiment, the first abutment distance is greater than 40% of the working distance. In an embodiment, the first abutment distance is greater than 30% of the working distance. In an embodiment, the first abutment distance is greater than 20% of the working distance.

The presence of a first portion allows the jaw to adjust the spacing between the first abutment wall and the second portion, the one against which the rim flange comes into abutment. The adjustable spacing increases the range of thicknesses which the jaw is able to grip.

In fact, this percentage value is a relative value with respect to the total working distance of the jaw and is basically indicative of the flexibility with respect to the intervals of flanges that can be processed with the same working distance of the jaw.

In an embodiment, the jaw comprises a switch element. The switch element is movable. More specifically, the switch element is movable between a first position, where it is at an advanced position relative to the abutment surface, in the spacing-apart direction of the clamping orientation (that is, where it is superposed on the abutment surface in the spacing-apart direction of the clamping orientation, to strike the flange before the abutment surface does), and a second position, where it is located externally of the connecting zone. In an embodiment, the switch element, at its second position, is disjointed from the jaw.

The switch element comprises an inclined wall. The inclined wall of the switch element is configured to come into contact with the wheel rim. The inclined wall has a first and a second end. The first end of the inclined wall is proximal to the first abutment wall at the first position of the switch element. The second end of the inclined wall is proximal to the second abutment wall at the first position of the switch element.

In an embodiment, the first end of the inclined wall is aligned with the first portion of the abutment surface along the clamping orientation. In other words, the inclined wall of the switch element is longitudinally closer to the first abutment wall than the second portion of the abutment surface.

In an embodiment, the first end of the inclined wall is spaced from the first abutment wall by a second abutment distance. The second abutment distance is smaller than the first abutment distance. More specifically, in an embodiment, the second abutment distance is equal to a percentage of the working distance less than 20%, preferably less than 15% or 10% of the working distance.

In an embodiment, the jaw is movable between a first operating configuration, in which the switch element is at a first position and in which the inclined wall of the switch element is configured to abut against the wheel rim, and a second operating configuration, in which the switch element is at a second position and in which the second portion of the abutment surface is configured to abut against the wheel rim.

The presence of the switch element allows further increasing the range of flange thicknesses that can be handled. In effect, without the switch element, when working on rims with relatively thin flanges, the flange might abut only against the first portion of the abutment surface, which is not designed for that purpose, thereby weakening jaw grip. With the switch element, the distance between the inclined wall and the first abutment surface may be reduced, thus obtaining a firm grip even in the case of rim flanges of limited thickness.

In an embodiment, the inclined wall has an angle of incidence of between 10 and 80 degrees relative to the first abutment wall. In an embodiment, the angle of incidence is between 20 and 70 degrees. In an embodiment, the angle of incidence is between 30 and 60 degrees. In effect, if the angle of incidence is too high, the rim is not gripped correctly and is subjected to high stresses. If the angle of incidence is too low, on the other hand, the range of thicknesses of flanges that can be clamped is reduced.

In an embodiment, the switch element is removable from the body. In this embodiment, the switch element is removed from the body when it is at the second position.

In an embodiment, the second end of the inclined wall is at the same position or at a position behind the second end of the second abutment wall in the spacing-apart direction of the clamping orientation.

In an embodiment, the body comprises a pin. The body comprises a connecting hub. The connecting hub is made in the base portion. In an embodiment, the switch element comprises a mounting hole. The pin is inserted into the connecting hub and into the mounting hole when the switch element is at the first position, in order to mount the switch element to the jaw.

In an embodiment, the switch element comprises a protrusion. When the switch element is at the first position, the protrusion protrudes at least partly along the clamping orientation. When the switch element is at the first position, the protrusion extends along the longitudinal orientation. In an embodiment, the abutment surface comprises a guide groove, extending along the longitudinal orientation. When the switch element is at the first position, the protrusion is coupled to the guide groove of the abutment surface.

This shape coupling between the switch element and the abutment surface further increases the stability of the switch element at its first position.

In an embodiment, the jaw comprises a wear element. The wear element is located on an abutment surface of the first abutment wall. The wear element is configured to come into contact with a wheel rim. In an embodiment, the jaw comprises an additional wear element, located on the second abutment wall.

The wear element on the first abutment wall is replaceable (that is, removable) when it reaches a critical wear level.

In an embodiment, the first and second abutment walls each comprise a respective top surface. In an embodiment, the top surface of the first abutment wall comprises a respective plurality of studs. In addition, or alternatively, the top surface of the second abutment wall comprises a respective plurality of studs.

In an embodiment, the jaw comprises a socket. The socket is located downstream of the first abutment wall, along the longitudinal orientation in a direction of insertion, directed from the first to the second abutment wall. In an embodiment, the jaw comprises an extension. The extension is coupled to the socket. The extension comprises an interface surface facing in the spacing-apart direction of the clamping orientation. The interface surface includes a respective plurality of studs.

In an embodiment, the first portion of the abutment surface is perpendicular to the first abutment wall. Compared to the solution where the first portion is not perpendicular, this embodiment allows obtaining the maximum spacing between the second portion and the first abutment wall, thereby increasing the size of the thicknesses that can be handled.

According to an aspect of it, this disclosure provides a wheel-holder unit. The wheel-holder unit includes a head which rotates about an axis of rotation. The wheel-holder unit includes a lift actuator, connected to the head to move it along a trajectory having at least a vertical component, parallel to the weight force.

The head includes a plurality of jaws, disposed around the axis of rotation of the head. The jaws of the plurality are angularly spaced and movable along the clamping orientation (that is, the radial orientation perpendicular to the axis of rotation of the head) to move towards and away from each other between a position distal from, and a position proximal to, the axis of rotation of the head.

Each jaw of the plurality is a jaw according to one or more of the features described in this disclosure in connection with the jaws.

According to an aspect of it, this disclosure also provides a tyre changing apparatus comprising a wheel-holder unit according to one or more of the features described in this disclosure with reference to the wheel-holder unit.

According to an aspect of it, this disclosure provides a method for mounting or demounting a wheel tyre on or from the corresponding rim.

The method comprises a step of preparing a tyre changing apparatus including a wheel-holder unit comprising a head, which rotates about an axis of rotation, and a plurality of jaws, which are angularly spaced around the axis of rotation of the head.

The method comprises a step of moving the head along the axis of rotation in a direction of insertion, to position the plurality of jaws inside the wheel rim.

In an embodiment, the method comprises a step of moving the wheel along the axis of rotation towards the head until the plurality of jaws are positioned inside the wheel rim.

The method comprises a step of moving the jaws along a clamping orientation perpendicular to the axis of rotation towards or away from each other between a position distal from, and a position proximal to, the axis of rotation of the head.

The method comprises a step of gripping (that is, a step of clamping) the wheel rim with the plurality of jaws, with the rim in contact with an abutment surface of each jaw.

In an embodiment, the abutment surface of the jaws used to carry out the method comprises a first portion and a second portion, inclined and diverging from the axis of rotation in the direction of insertion.

In an embodiment, in the step of gripping, the second portion comes into contact with the wheel rim.

In an embodiment, the method comprises a step of reconfiguring. In the step of reconfiguring, a switch element of each jaw is moved between a first position and a second position. At the first position, the switch element is moved to a position where it is superposed on the abutment surface. The first positon of the switch element defines a first configuration of the jaw, in which the switch element (or an inclined wall thereof) comes into abutment against the rim. At the first position, the switch element is positioned in such a way that its inclined wall is positioned, along the longitudinal orientation (that is, along the axis of rotation of the head), closer to the head than the second portion of the abutment surface is. When the switch element is at the second position, the abutment surface directly faces the rim because the switch element is removed from the body of the jaw or is positioned on the outside of the connecting zone (that is to say, it is out of alignment with the abutment surface along the clamping orientation). When the switch element is at the second position, the jaw is in a second configuration. When the jaw is in the second configuration, the second portion of the abutment surface abuts against the rim.

In other words, the change between the first and the second configuration changes the longitudinal position of the abutting element (the second portion of the abutment surface or the inclined wall of the switch element); more specifically, in the first configuration, the abutting element is closer to the first abutment wall of the jaw.

In the first configuration of the jaw, the inclined wall of the switch element is at least partly aligned with the first portion of the abutment surface along the clamping orientation.

In an embodiment, the step of reconfiguring comprises a step of removing. In the step of removing, the switch element is removed from the body when it is at the second position.

BRIEF DESCRIPTION OF THE DRAWING FIGURES

These and other features will become more apparent from the following detailed description of a preferred embodiment, illustrated by way of non-limiting example in the accompanying drawings, in which.

DETAILED DESCRIPTION

With reference to the accompanying drawings, the numeral 1 denotes a jaw for holding a wheel in a tyre changing apparatus.

The jaw 1 extends along a longitudinal orientation, between a first end 1A and a second end 1B. The jaw 1 also extends along a transverse orientation T, perpendicular to the longitudinal orientation T. The jaw 1 also extends radially along a clamping orientation R, perpendicular to the transverse orientation T and to the longitudinal orientation L.

The jaw 1 comprises a top surface 10, a first lateral surface 11, a second lateral surface 12 and a bottom surface 13.

In an embodiment, at least for some types of flanges, the top surface 10 of the jaw 1 is configured to come into contact with a flange of the wheel.

In a preferred embodiment, the jaw 1 comprises a body 2. In a preferred embodiment, the body 2 is a mechanical part moulded in one piece. At all events, even in the case where the body is moulded in one piece, different portions of the body 2 may be distinguished.

The body 2 comprises a base portion 21. The base portion 21 is opposite to the top surface 10 of the jaw. The base portion 21 defines the bottom surface 13 of the jaw 1. The base portion 21 comprises a connecting zone 22 which is configured to engage a corresponding connecting element of a wheel-holder unit. In an embodiment, the connecting zone 22 comprises a first hole 221 and a second hole 222, configured to receive respective connecting pins by which the jaw 1 is connected to the corresponding wheel-holder unit. The first hole 221 and the second hole 222 are spaced along the clamping orientation R. The first hole 221 and the second hole 222 are located in the proximity of the first end 1A of the jaw, along the longitudinal orientation L.

For convenience of description, the term "direction of insertion" VI is used herein to identify the direction along the longitudinal orientation L, directed from the first end 1A to the second end 1B of the jaw 1.

The body 2 comprises a first abutment wall 23. In an embodiment, the first abutment wall 23 is located downstream of the connecting zone 22 along the longitudinal orientation in the direction of insertion VI.

The first abutment wall 23 extends from the base portion 21 along the clamping orientation R between a first end 23A and a second end 23B.

The first abutment wall comprises a top surface 231, at the second end 23A of the first abutment wall 23, a first lateral surface 232 and a second lateral surface 233. The first lateral surface 232 is perpendicular to the longitudinal orientation L and facing in the direction opposite to the direction of insertion VI. The second lateral surface 233 is perpendicular to the longitudinal orientation L and facing in the direction of insertion VI.

In an embodiment, the top surface 231 of the first abutment wall 23 includes a first plurality of studs (bosses, spikes) 2311.

In an embodiment, the first abutment wall 23 comprises a recess 234, made at the second lateral surface 233. In an embodiment, the jaw 1 comprises a first wear pad 14. The first wear pad 14 is located inside the recess 234. In an embodiment, the depth of the recess is less than the thickness of the first wear pad 14 so that the first element to be abutted is the first wear pad 14 and not the second lateral surface 233 of the first abutment wall 23. In other words, the first wear pad 14 protrudes from the second lateral surface 233. The recess 234 is made between the first end 23A and the second end 23B of the first abutment wall 23, along the clamping orientation R. In an embodiment, the recess 234 has a square, rectangular or circular shape. The first wear pad 14 is shaped to match the recess 234 and is therefore square, rectangular or circular, depending on the embodiment selected for the recess 234.

In an embodiment, the recess 234 comprises a hollow 2341 on its bottom wall 234'. In an embodiment, the first wear pad 14 also comprises a corresponding pin. The pin of the first wear pad 14 engages in the hollow 2341 of the recess 234. This shape fit creates a more stable coupling between the recess 234 and the first wear pad 14.

In an embodiment, with regard to the first abutment wall 23, the first lateral surface 232 is smaller in surface extension than the second lateral surface 233 because the base portion 21 is connected to the first lateral surface 232 at a point higher up (further away from the bottom surface 13 of the jaw 1 along the clamping orientation R) than the connecting point where the base portion 21 is connected to the second lateral surface 233. This aspect is important because it allows more effectively limiting the bending stresses on the first abutment wall 23 which are, in most cases (predominantly) directed in the direction opposite to the direction of insertion VI.

The body 2 comprises a second abutment wall 24. In an embodiment, the second abutment wall 24 is located downstream of the first abutment wall 23 along the longitudinal orientation in the direction of insertion VI.

The second abutment wall 24 extends from the base portion 21 along the clamping orientation R between a first end 24A and a second end 24B.

The second abutment wall comprises a respective top surface 241, at its second end 24A, a respective first lateral surface 242 and a respective second lateral surface 243. The first lateral surface 242 is perpendicular to the longitudinal orientation L and facing in the direction opposite to the direction of insertion VI: in other words, it faces the first abutment wall 23. The second lateral surface 243 is perpendicular to the longitudinal orientation L and facing in the direction of insertion VI.

In an embodiment, the top surface 241 of the second abutment wall 24 includes a second plurality of studs (bosses, spikes) 2411.

In an embodiment, the second abutment wall 24 comprises a recess 244, made at the second lateral surface 243. In an embodiment, the jaw 1 comprises a second wear pad 15. The second wear pad 15 is located inside the recess 244 of the second abutment wall 24. In an embodiment, the depth of the recess 244 is less than the thickness of the second wear pad 15 so that the first element to be abutted is the second wear pad 15 and not the second lateral surface 243 of the second abutment wall 24. In other words, the second wear pad 15 protrudes from the second lateral surface 243. The recess 244 is made between the first end 24A and the second end 24B of the second abutment wall 24, along the clamping orientation R. The recess 244 may have a square, rectangular or circular shape. The second wear pad 15 is shaped to match the recess 244 and is therefore square, rectangular or circular, depending on the embodiment selected for the recess 244.

In an embodiment, the recess 244 comprises a hollow 2441 on its bottom wall 244'. In an embodiment, the second wear pad 15 also comprises a corresponding pin. The pin of the second wear pad 15 engages in the hollow 2441 of the recess 244. This shape fit creates a more stable coupling between the recess 244 and the second wear pad 15.

In an embodiment, the first lateral surface 242 is smaller in surface extension than the second lateral surface 243 because the base portion 21 is connected to the first lateral surface 242 at a point higher up (further away from the bottom surface 13 of the jaw 1 along the clamping orientation R) than the connecting point where the base portion 21 is connected to the second lateral surface 243.

This aspect is important because it allows more effectively limiting the bending stresses on the second abutment wall 24 which are, in most cases (predominantly) directed in the direction opposite to the direction of insertion VI.

The base portion 21 comprises an abutment portion 25. The abutment portion 25 is interposed between the first abutment wall 23 and the second abutment wall 24 along the longitudinal orientation L.

The abutment portion 25 extends longitudinally from the first abutment wall 23 to the second abutment wall 24 terminating thereat at a respective first transition point 25A and second transition point 25B.

The abutment portion 25 comprises an abutment surface 251, facing radially opposite to the bottom surface 13 of the jaw 1. In an embodiment, therefore, the abutment surface is, at least in one operating configuration, part of the top surface 10 of the jaw 1: that is, the surface adapted to come into contact with the rim flange.

In a preferred embodiment, the abutment surface 251 includes a flat portion 251A, where the abutment surface 251 is substantially parallel to a plane defined by the longitudinal orientation L and the transverse orientation T.

In a preferred embodiment, the abutment surface 251 includes an inclined portion 251B, where the abutment surface 251 is substantially inclined at an angle different from 0° and 180° to the plane defined by the longitudinal orientation L and the transverse orientation T. Preferably, at its inclined portion 251B, the abutment surface 251 is substantially inclined at an angle of between 30° and 60° A to the longitudinal orientation L (that is, to a plane parallel to the longitudinal orientation L and to the transverse orientation T).

In an embodiment, the first abutment wall 23 and the second abutment wall 24 are longitudinally spaced by a working distance DL.

In an embodiment, the longitudinal extension of the flat portion 251A of the abutment surface 251 is less than 9/10 of the working distance DL and greater than 1/10 of the working distance DL. In an embodiment, the longitudinal extension of the flat portion 251A of the abutment surface 251 is less than 8/10 of the working distance DL and greater than 2/10 of the working distance DL.

In an embodiment, the longitudinal extension of the flat portion 251A of the abutment surface 251 is less than 7/10 of the working distance DL and greater than 3/10 of the working distance DL.

In an embodiment, the abutment surface 251 comprises an additional flat portion 251C. The flat portion 251A is in contact with the first abutment wall 23 at the first transition point 25A. The additional flat portion 251C is in contact with the second abutment wall 24 at the second transition point 25B. Thus, along the longitudinal orientation L, the inclined portion 251B is interposed between the flat portion 251A and the additional flat portion 251C.

The additional flat portion 251C is not essential but defines a notch which may acts as a functional abutment for coupling the abutment portion 25 to other mechanical components.

In an embodiment, the first abutment wall 23 and the second abutment wall 24 are spaced by a working distance DL. More specifically, the working distance DL is the longitudinal distance between the first lateral surface 232 of the first abutment wall 23 and the second lateral surface 243 of the second abutment wall 24.

The flat portion 251A—that is, the first portion 251A—is spaced along the longitudinal orientation L by a first abutment distance D1, which is greater than 30% of the working distance DL.

In an embodiment, the flat portion 251A has a longitudinal extension of between 10 mm and 50 mm. In an embodiment, the flat portion 251A has a longitudinal extension of between 15 mm and 45 mm. In an embodiment, the flat portion 251A has a longitudinal extension of between 20 mm and 35 mm. In an embodiment, the flat portion 251A has a longitudinal extension equal to 29.5 mm.

In an embodiment, the inclined wall 251B is inclined to the longitudinal orientation L at an angle between 10° and 50°.

In an embodiment, the inclined wall 251B is inclined at an angle between 20° and 45° to the longitudinal orientation L.

In an embodiment, the inclined wall 251B is inclined at an angle between 30° and 40° to the longitudinal orientation L.

In an embodiment, the inclined wall 251B is inclined at an angle of 36° to the longitudinal orientation L.

In an embodiment, the abutment portion 25 comprises a guide groove 252. The guide groove 252 is made in the abutment surface 251. The guide groove 252 has a longitudinal extension.

In an embodiment, the guide groove 252 extends from the flat portion 251A of the abutment surface 251 and terminates at the inclined portion 251B of the abutment surface 251.

In an embodiment, the guide groove 252 extends along the full longitudinal length of the flat portion 251A and terminates at the first abutment wall 23. In an embodiment, the guide groove 252 extends along the full longitudinal length of the inclined portion 251B of the abutment surface 251, stopping at the additional flat portion 251C, if present, or giving onto the second abutment wall 24 in the case where the additional flat portion 251C is not present.

In an embodiment, the transverse extension of the abutment surface is variable along the longitudinal orientation L.

More specifically, in an embodiment, the transverse extension of the abutment surface 251 in the proximity of the first abutment wall 23 is greater than the transverse extension of the abutment surface 251 in the proximity of the second abutment wall 24.

For convenience of description, the term "spacing-apart direction" VA is used in this disclosure to denote the direction from the bottom surface 13 to the top surface 11 of the jaw 1, along the clamping orientation R.

In an embodiment, the jaw 1 comprises a switch element 3.

The switch element 3 is movable between a working position PL, where it is positioned downstream of the abutment portion 25 in the spacing-apart direction VA along the clamping orientation R, and a rest position PR. At the rest position PR, the switch element 3 may adopt one of the following positions: a position where it is radially misaligned with the abutment portion; a position where the switch element 3 is radially aligned with the abutment portion 25 but where it is positioned upstream of the bottom surface 13 in the spacing-apart direction VA; a removed position where the switch element 3 is spaced from and completely clear of the body 2 of the jaw.

Thus, at the working position PL, the switch element 3 is superposed on the abutment surface 251 to define another interface adapted to come into contact with the rim flange.

More specifically, the switch element 3 comprises an inclined wall 31 which extends from a first end 31A and a second end 31B and which acts as an abutment for the rim flange instead of the abutment surface 251.

In an embodiment, the inclined wall 31 of the switch 3, when the latter is at the first operating position, is parallel to the inclined portion 251B of the abutment surface 251.

Figure 2:
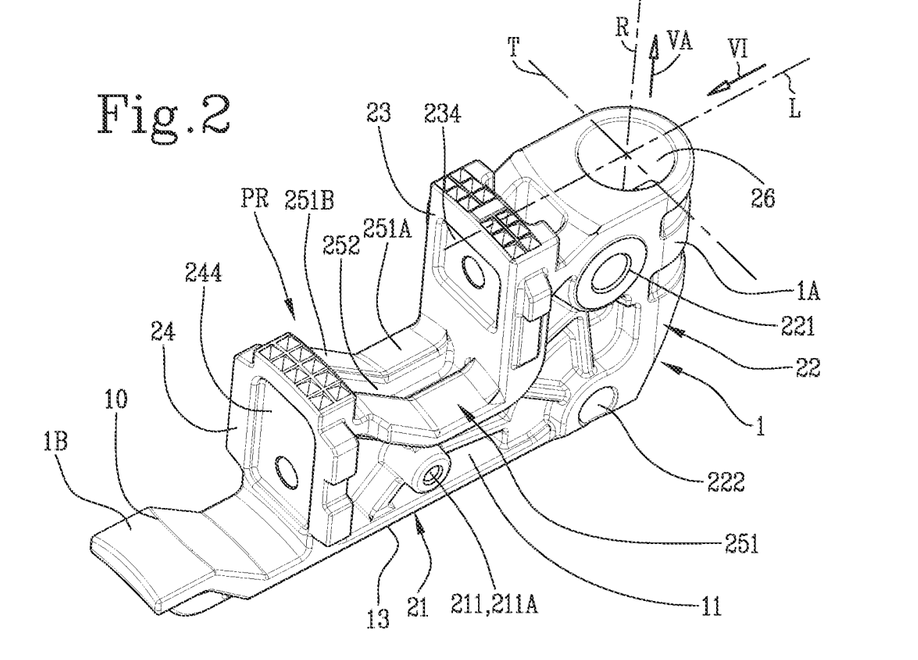
FIG. 2 shows a perspective view of a jaw according to this disclosure, in a first operating configuration.
Figure 3A:
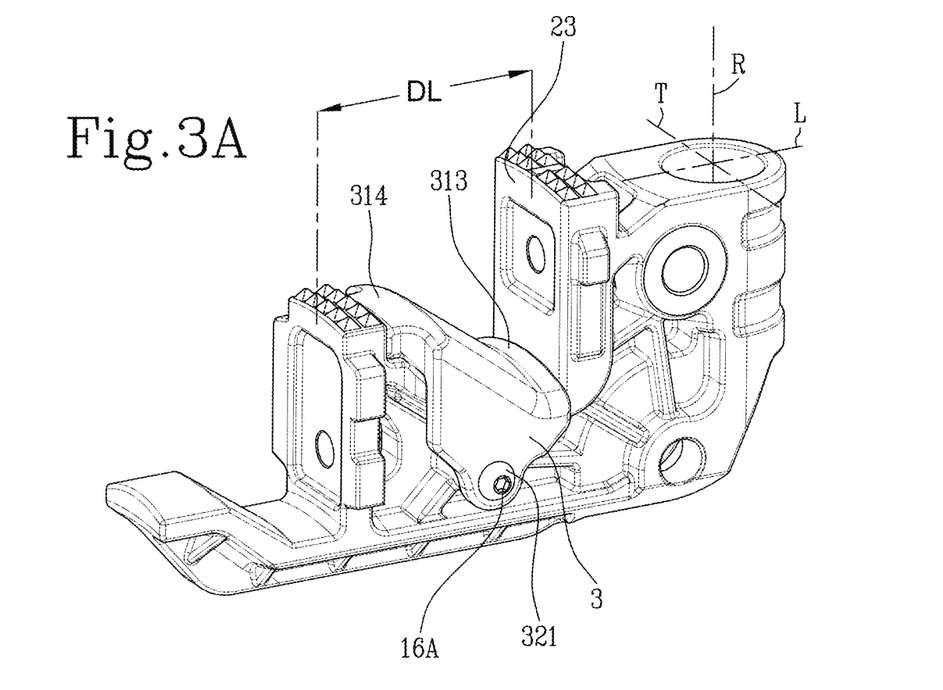
FIGS. 3A and 3B show, respectively, a first and a second perspective view of the jaw of FIG. 1 in a second operating configuration.
Figure 3B:
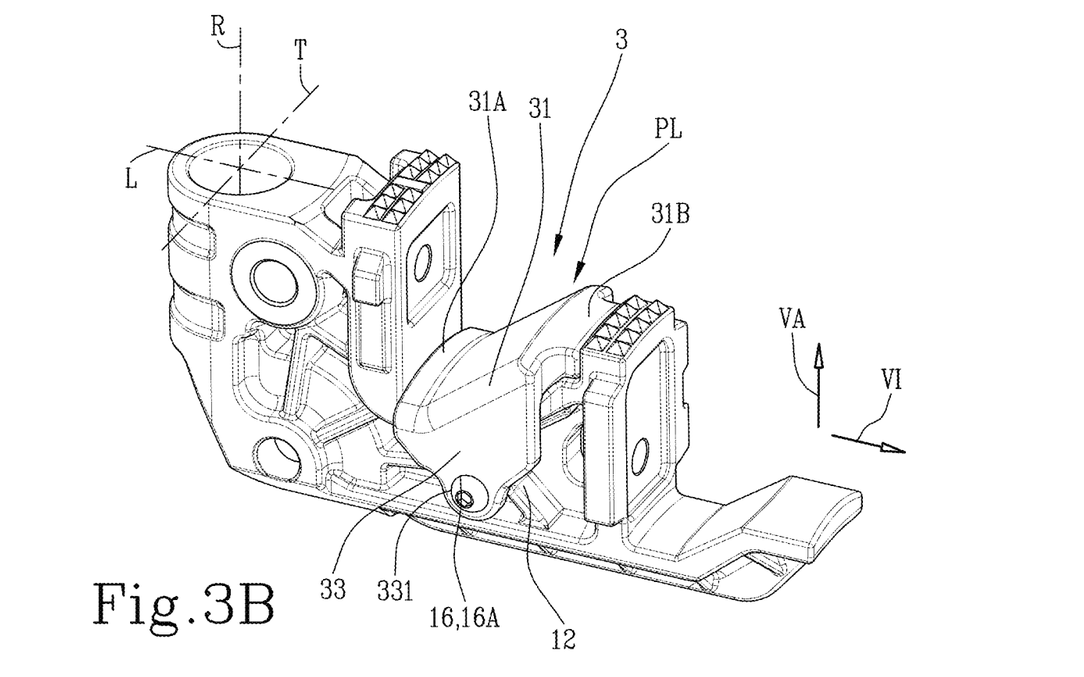
Figure 4:
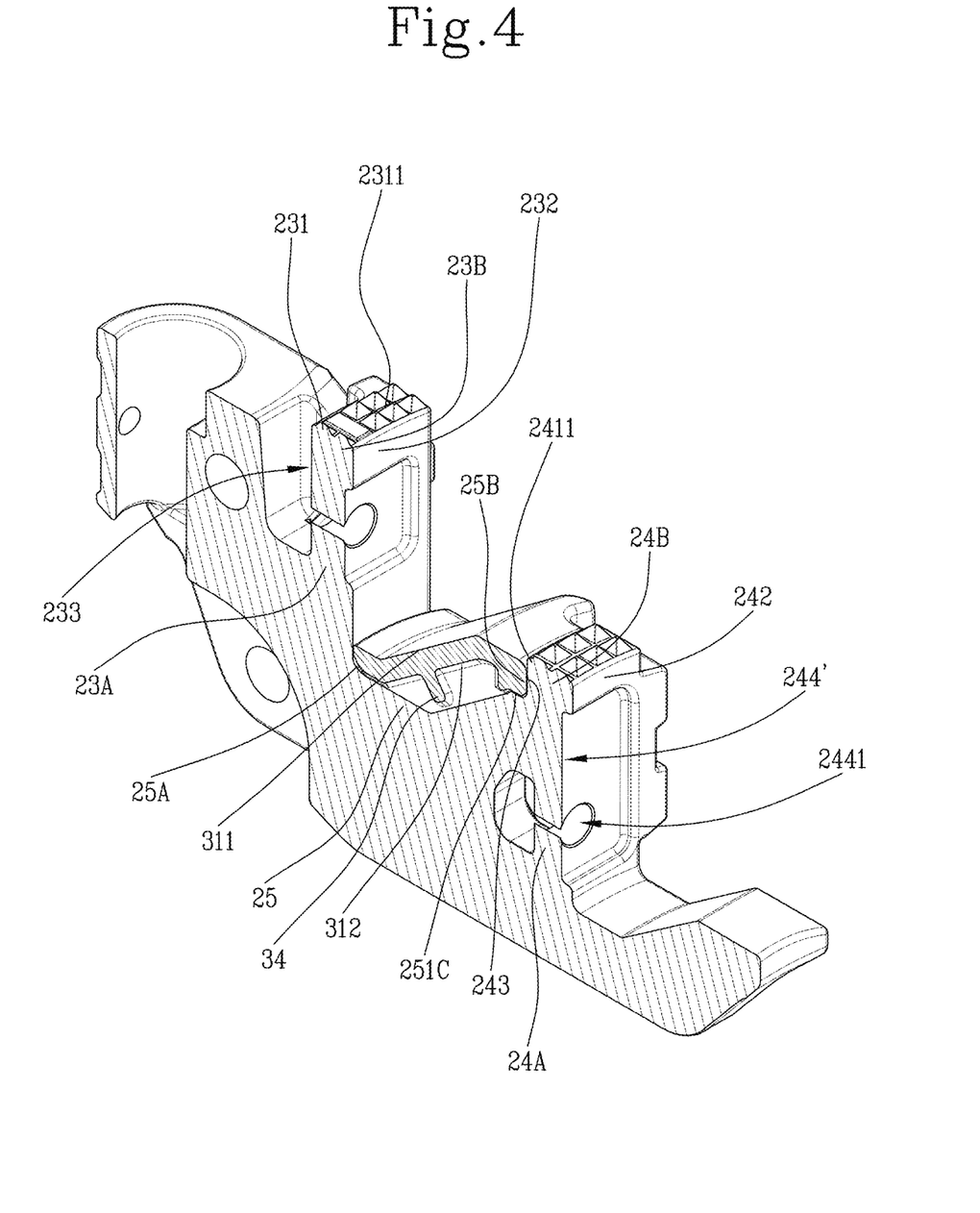
FIG. 4 shows a side cross section of the jaw of FIGS. 3A and 3B.

Therefore, at least two operating configurations of the jaw 1 can be defined:
- a first operating configuration, in which the switch element is at the rest position PR and in which the flange abuts against the abutment surface 251 and the first abutment wall 23 (the first wear pad 14);
- a second operating configuration, in which the switch element is at the working position PL and in which the flange abuts against the switch element 3 and the first abutment wall 23 (the first wear pad 14).

Thus, the jaw 1 is configurable between the first operating configuration and the second operating configuration by modifying the position of the switch element 3.

Thanks to these features, which allow the jaw to be reconfigured, an operator can use the same jaw 1 to work on wheels having different rim flange thicknesses.

Figure 5A:
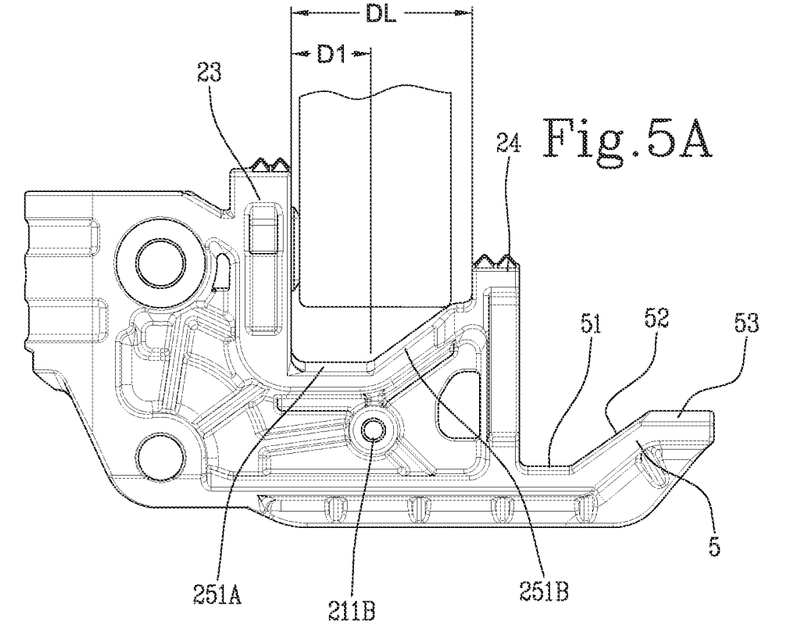
FIGS. 5A and 5B illustrate the jaw in the operating configuration of FIG. 2 and in the operating configuration of FIG. 3, respectively, in contact with a wheel flange.
Figure 5B:
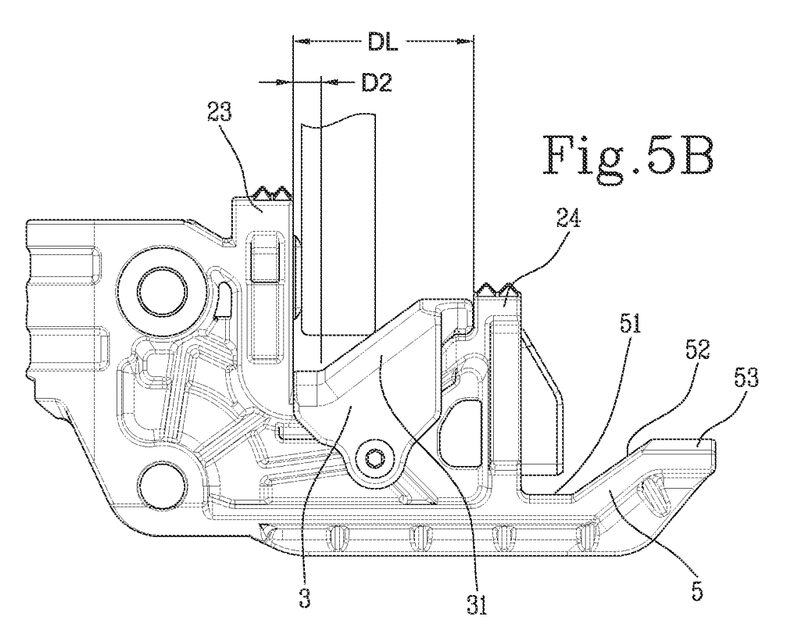

More in detail, when working on wheels whose flange thickness is relatively large, the jaw 1 is in the first operating configuration (switch element 3 at the rest position PR) and the flange abuts against the abutment surface 251.

For smaller flange thicknesses, on the other hand, the jaw 1 is at the second operating configuration (switch element 3 at the working position PL) and the flange abuts against the inclined wall 31 of the switch element 3.

The first end 31A of the inclined wall 31 is spaced from the first abutment wall 23 by a second abutment distance D2, which is smaller than the first abutment distance D1. More specifically, the second abutment distance D2 is less than 20% of the working distance DL, preferably less than 10% of the working distance DL.

In an embodiment, the switch element 3 comprises a first side wall 32 and a second side wall 33, which extend from the inclined wall 31.

The first and second side walls 32, 33 are parallel to each other. In an embodiment, the first side wall 32 comprises, at the end of it distal from the inclined wall 31, a first mounting hole 321 that passes through the first side wall 32.

In an embodiment, the second side wall 33 comprises, at the end of it distal from the inclined wall 31, a second mounting hole 331 that passes through the second side wall 33.

In an embodiment, the inclined wall 31 has a facing surface 311 and a coupling surface 312, opposite to the facing surface 311.

The switch element 3 comprises a protrusion 34 on the coupling surface 312. The protrusion 34 extends (protrudes) from the coupling surface 312.

In an embodiment, the inclined wall 31 includes a first interface portion 313 and a second interface portion 314 at its first end 31A and second end 31B.

In an embodiment, when the switch element 3 is at the working position, the inclined wall 31 is positioned above the abutment surface 251 along the clamping orientation in the spacing-apart direction VA.

In an embodiment, when the switch element 3 is at the working position PL, the coupling surface 312 is in contact with the abutment surface 251.

More specifically, the protrusion 34 of the switch element 3 is received in the guide groove 252.

In an embodiment, when the switch element 3 is at the working position PL, the first lateral surface 32 and the second lateral surface 33 extend in parallel with the first lateral surface 11 and the second lateral surface 12 of the jaw 1, respectively.

In an embodiment, when the switch element 3 is at the working position PL, the first interface portion 313 of the switch element is in contact with the first transition point 25A, preferably abutting against the flat portion 251A of the abutment surface 251.

In an embodiment, when the switch element 3 is at the working position PL, the second interface portion 314 of the switch element 3 is in contact with (abuts against) the additional flat portion 251C of the abutment surface 251.

In an embodiment, the base portion 21 comprises a connecting hub 211. Preferably, the connecting hub 221 is interposed between the first abutment wall 23 and the second abutment wall 24 along the longitudinal orientation L.

In an embodiment, the connecting hub 211 passes through the body 2 of the jaw 1 along the transverse orientation T.

In other embodiments, the base portion comprises two connecting hubs 211A, 211B, located on the first lateral surface 11 and on the second lateral surface 12, respectively. The connecting hubs 211A, 211B do not pass through the jaw body.

In an embodiment, when the switch element 3 is at the working position PL, the connecting hub 211 is aligned along the transverse orientation T with the first mounting hole 321 and the second mounting hole 331 of the switch element 3.

More specifically, the jaw 1 comprises a mounting pin 16. When the switch element 3 is at the working position PL, the mounting pin 16 passes through the first mounting hole 321, the second mounting hole 331 and the connecting hub 211, to lock the switch element 3 to the body 2 of the jaw 1. When the switch element 3 is at the rest position PR, the pin 16 is, in an embodiment, removed from the mounting holes.

In an embodiment, the jaw 1 comprises two mounting pins 16A, 16B, each configured to be inserted into a corresponding connecting hub 211A, 211B.

In an embodiment, when the switch element 3 is at the working position PL, each mounting pin 16A, 16B passes through the respective first or second mounting hole 321, 331 of the switch element 3 and is inserted into the respective connecting hub 211A, 211B of the body 2.

In an embodiment, the operating unit 2 comprises a socket 26. The socket 26 is located downstream of the first abutment wall 23 along the longitudinal orientation L in the direction of insertion VI.

The socket 26 is made in the body 2. The socket 26 extends along the clamping orientation R. In an embodiment, the socket 26 has a circular cross section. Alternatively, the socket 26 may have a rectangular or prismatic cross section.

Figure 6A:
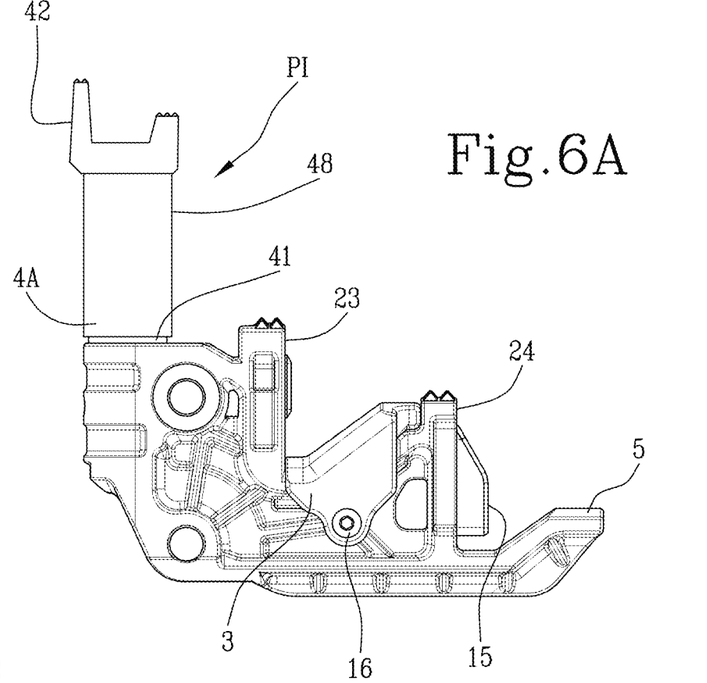
FIGS. 6A and 6B illustrate a first embodiment and a second embodiment of an extension of the jaw of FIG. 2 or 3.
Figure 6B:
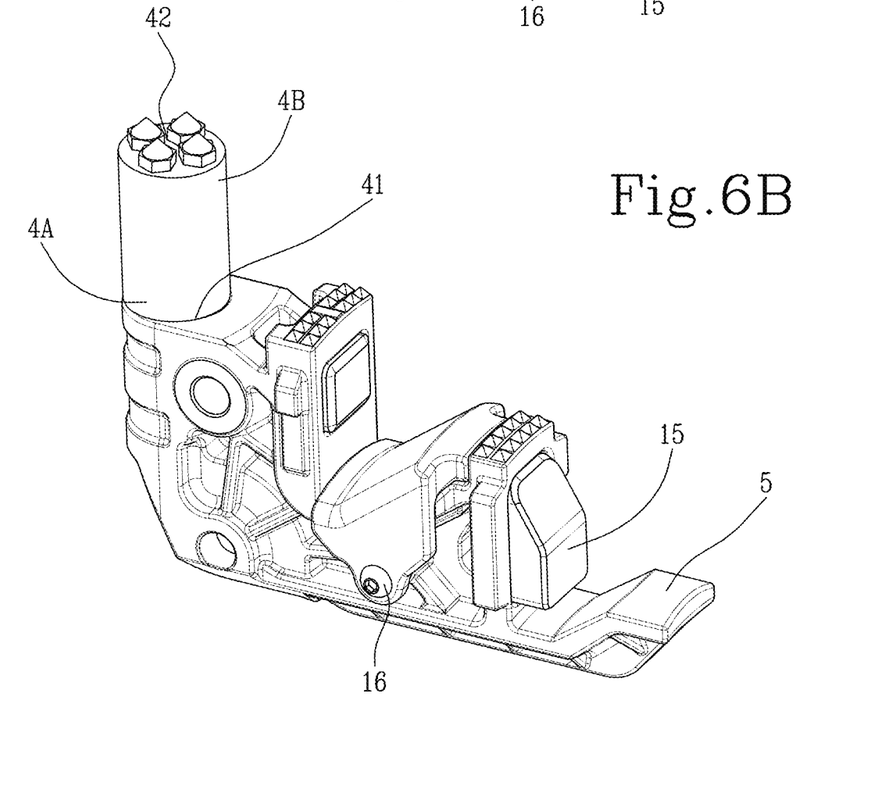

In an embodiment, the jaw 1 comprises an extension 4.

The extension 4 is configured to be inserted into the socket 26. More specifically, the extension 4 is movable between an inserted position PI, where it is partly housed in the socket 26, and an extracted position, where the extension 4 is removed from the socket 26.

In an embodiment, when the extension 4 is at the inserted position PI, it extends radially between a first end 4A and a second end 4B. The extension 4 comprises an end fitting 41, configured to be inserted into the socket 26. The end fitting 41 is shaped to match the cross section of the socket 26.

The extension 4 comprises an interface element 42, located at the second end 4B. The interface element 42 comprises a plurality of spikes 421, oriented in the spacing-apart direction VA to come into abutment against an inside surface of the wheel rim.

In an embodiment, the jaw 1 comprises a tip 5, disposed along the longitudinal orientation L in the direction of insertion VI at an advanced position relative to the second abutment wall 24.

More specifically, in an embodiment, the tip 5 has a profile which includes a first stretch 51, a second stretch 52 and/or a third stretch 53. More specifically, the first stretch 51 of the tip 5 is smoothly connected to the second abutment wall 24 at the first lateral surface 242 thereof. In an embodiment, the first stretch 51 is flat and substantially parallel to the longitudinal orientation L.

The second stretch 52 is smoothly connected to the first stretch 51. The second stretch 52 is inclined relative to the first stretch 51. The second stretch 52 is inclined relative to the longitudinal orientation L.

The third stretch 53 is located at the end of the jaw 1 further away from the chuck and closer to the rim. The third stretch 53 is smoothly connected to the second stretch 52. The third stretch 53 is inclined relative to the second stretch 52. The third stretch 53 is inclined relative to the longitudinal orientation L. In an embodiment, the third stretch 53 is flat and parallel to the longitudinal orientation L.

Figure 1:
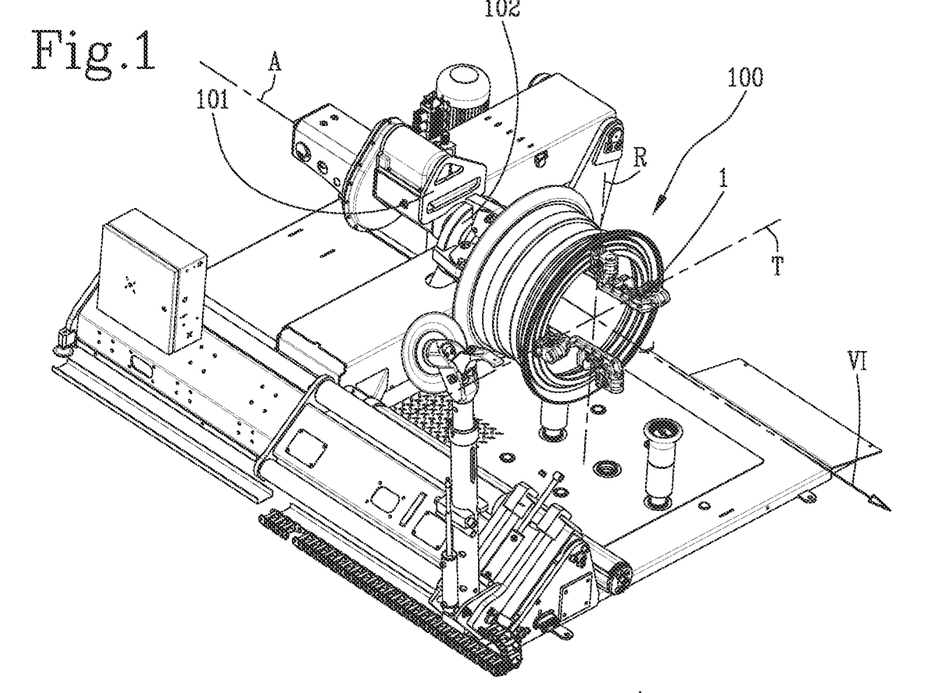
FIG. 1 shows a perspective view of a tyre changing apparatus for mounting or demounting a tyre on or from the respective rim.

According to an aspect of it, this disclosure provides a wheel-holder unit for a tyre changing apparatus 100. The wheel-holder unit is configured to clamp and move the wheel during the mounting and demounting operations carried out by the tyre changing apparatus 100.

More specifically, the wheel-holder unit comprises a head which rotates about an axis of rotation A. The head is movable along the axis of rotation A towards and away from the wheel.

The head comprises a plurality of jaws, where each jaw 1 is a jaw according to one or more of the features described in this disclosure. The jaws 1 are angularly spaced around the axis of rotation A. The jaws 1 disposed on the head are movable along a clamping orientation R towards and away from each other in order to grip the wheel rim.

Each jaw 1 is connected to the head at its connecting zone 22, at the first hole 221 of the connecting zone and/or at the second hole 222 of the connecting zone.

According to one aspect of it, this disclosure provides a tyre changing apparatus 100 for mounting or demounting a tyre on or from the corresponding wheel rim. The tyre changing apparatus 100 comprises a wheel-holder unit 101 including one or more of the features described in this disclosure.

The tyre changing apparatus 100 includes a plurality of jaws 1 including one or more of the features described in this disclosure.

According to an aspect of it, this disclosure provides a method for mounting or demounting a wheel tyre on or from the corresponding rim.

The method comprises a step of preparing a tyre changing apparatus 100, including a wheel-holder unit 101 comprising a head 102, which rotates about an axis of rotation A, and a plurality of jaws 1, which are angularly spaced around the axis of rotation A of the head 102.

The method comprises a step of moving the head 102 along the axis of rotation A in a direction of insertion VI, to position the plurality of jaws 1 inside the wheel rim.

In an embodiment, the method comprises a step of moving the wheel along the axis of rotation A in a direction opposite to the direction of insertion VI—that is, towards the head 102 until the plurality of jaws are positioned inside the wheel rim. The method comprises a step of moving the jaws away from each other from a proximal position to a distal position relative to the axis of rotation A of the head 102.

The method comprises a step of gripping (a flange of) the wheel rim with the plurality of jaws 1, with the rim in contact with an abutment surface 251 of each jaw 1.

The abutment surface 251 of each jaw 1 used in this method comprises a first portion, which is parallel to the axis of rotation A of the chuck, and a second portion, which is inclined to and divergent from the axis of rotation A in the direction of insertion.

In the step of gripping, the second portion (the inclined portion) comes into contact with the wheel rim.

The method comprises a step of mounting and/or demounting in which a working tool comes into contact with the wheel tyre to mount it on, or remove it from, the respective rim.

The method comprises a step of moving the jaws towards each other from the distal position to the proximal position relative to the axis of rotation A of the head, so as to release the wheel after having performed the mounting or demounting operations.

In an embodiment, the method comprises a step of reconfiguring in which a switch element 3 of each jaw 1 is moved between a working position PL, where it is superposed on the abutment surface 251 along the clamping orientation R to define a first configuration of the jaw 1, and a rest position PR, where the abutment surface 251 is directly facing the rim to define a second configuration of the jaw.

In an embodiment, when the jaw is in the first configuration, the rim comes in to contact with an inclined wall 31 of the switch element 3.

In an embodiment, the step of reconfiguring comprises a step of removing, in which the switch element 3 is removed from the body 2 of the jaw 1 when it is at the rest position PR. The step of configuring comprises a step of engaging the switch element 3 to a body 2 of the jaw 1. More specifically, the switch element 3 comprises a first mounting hole 321 and a second mounting hole 331 which are aligned with a connecting hub 211 (or with two connecting hubs 211A, 211B). In a further possible embodiment (not illustrated), the switch element 3 is movable relative to the body 2 thanks to pins (connected to the switch element) which slide in respective slots made in the body 2; the role of the pins and the slots might be exchanged.

Next, a mounting pin 16 is inserted through the first mounting hole 321, through the second mounting hole 331 and through the connecting hub 211. Alternatively, if there are two mounting pins 16A, 16B, each of the mounting pins 16A and 16B is inserted into a respective mounting hole 321, 331 and into a respective connecting hub 211A, 211B. That way, the switch element 3 is fixed to the body 2 of the jaw 1.

What is claimed is:

1. A jaw for clamping a wheel rim in a tyre changing apparatus provided with a wheel-holder unit having a head, wherein the jaw extends along a longitudinal direction parallel to a longitudinal axis, between a first end and a second end, and extends along a transverse direction, perpendicular to the longitudinal direction, and extends along a clamping direction, perpendicular to the transverse direction and to the longitudinal direction, and wherein the jaw includes a top surface, a first lateral surface, a second lateral surface and a bottom surface, the jaw comprising a body extending along the longitudinal direction, the body including:
a connecting portion, located at the first end of the jaw and configured to be connected to the head of the wheel-holder unit;
a base portion extending along the longitudinal direction and defining the bottom surface of the jaw;
a first abutment wall, extending from the base portion along the transverse direction and along the clamping direction away from the bottom surface of the jaw;
a second abutment wall, extending from the base portion along the transverse direction and along the clamping direction away from the bottom surface of the jaw, the second abutment wall being longitudinally spaced from the first abutment wall by a working distance;
an abutment surface, longitudinally interposed between the first abutment wall and the second abutment wall and connected thereto, the abutment surface defining a portion of the top surface of the jaw located between the first abutment wall and the second abutment wall, wherein the abutment surface comprises a first portion, connected to the first abutment wall and extending along a first plane parallel to the longitudinal direction and parallel to the transverse direction for the entirety of the first portion, and a second portion, connected to the first portion and to the second abutment wall, the second portion extending along a second plane parallel to the transverse direction and inclined with respect to the longitudinal direction so that the second portion is at an increasingly larger distance from the bottom wall, along the longitudinal direction from the first portion to the second abutment wall,
wherein the first portion of the abutment surface has a longitudinal length greater than 30% of the working distance,
a switch element, including an inclined wall extending from a first end to a second end and having a first portion and a second portion, located between the first end and the second end so that the first portion is connected to the first end and the second portion is connected to the second end, the switch being removably connectable to the body, so that
in a first position, the switch element is located in a connecting zone of the body longitudinally interposed between the first abutment wall and the second abutment wall, with the first end proximal to the first abutment wall and the second end proximal to the second abutment wall, the inclined wall being configured to come into contact with the wheel rim, wherein, with the switch located in the connecting zone, the first portion and the second portion of the switch element extends along the longitudinal direction, so that a ratio between the longitudinal length of the first portion and the second portion of the switch element is different than a ratio between the longitudinal length of the first portion and the second portion of the abutment surface, and in at least a second position, the switch element is removed from the abutment surface of the body and it is on the outside of the connecting zone.

2. The jaw according to claim 1, wherein the first end of the inclined wall is spaced from the first abutment wall by a second abutment distance which is less than 30% of the working distance.

3. The jaw according to claim 1, wherein the second end of the inclined wall is at the same height or at a position behind the second end of the second abutment wall in the departing verse of the clamping direction.

4. The jaw according to claim 1, wherein the body comprises a pin and a connecting hub made in the base portion, and wherein the switch element comprises a mounting hole, the pin being inserted into the connecting hub and into the mounting hole when the switch element is at the first position, so as to connect the switch element to the body of the jaw.

5. The jaw according to claim 1, wherein the switch element comprises a protrusion, protruding at least partly along the clamping direction and, when the switch element is at the first position, extending along the longitudinal direction, and wherein the abutment surface comprises a corresponding guide groove, extending along the longitudinal direction, and wherein, when the switch element is at the first position, the protrusion is positioned within the guide groove of the abutment surface.

6. The jaw according to claim 1, comprising a wear element, located on an abutment surface of the first abutment wall and configured to come into contact with a wheel rim.

7. The jaw according to claim 1, wherein the first abutment wall and the second abutment wall each comprise a respective top surface including a corresponding plurality of studs.

8. The jaw according to claim 1, wherein the body comprises a socket, located at a position behind the first abutment wall along the longitudinal direction, and wherein the jaw comprises an extension, coupled to the socket and comprising an interface surface including a respective plurality of studs.

9. The jaw according to claim 1, wherein the first portion of the abutment surface is perpendicular to the first abutment wall.

10. A wheel-holder unit for a tyre changing apparatus, the wheel-holder unit comprising a head, the head being rotatable about an axis of rotation, and a lift actuator, connected to the head to move it along a trajectory having at least a vertical component, parallel to the weight force, wherein the head includes a plurality of jaws which are angularly spaced around the axis of rotation and which are movable towards and away from each other between a position where they are distal from, and a position where they are proximal to, the axis of rotation of the head, wherein each jaw of the plurality of jaws is a jaw for clamping a wheel rim in a tyre changing apparatus provided with a wheel-holder unit having a head, the jaw comprising a body extending along a longitudinal direction parallel to a longitudinal axis between a first end and a second end, and extends along a transverse direction, perpendicular to the longitudinal direction, and extends along a clamping direction, perpendicular to the transverse direction and to the longitudinal direction, and wherein the jaw includes a top surface, a first lateral surface, a second lateral surface and a bottom surface, the body including:
  a connecting portion, located at the first end of the jaw, configured to be connected to the head of the wheel-holder unit;
  a base portion extending along the longitudinal direction and defining the bottom surface of the jaw;
  a first abutment wall, extending from the base portion along the transverse direction and along the clamping direction;
  a second abutment wall, extending from the base portion along the transverse direction and along the clamping direction away from the bottom surface of the jaw, the second abutment surface wall being longitudinally spaced from the first abutment wall by a working distance;
  an abutment surface, longitudinally interposed between the first abutment wall and the second abutment wall and connected thereto, the abutment surface defining a portion of the top surface of the jaw located between the first abutment wall and the second abutment wall, wherein the abutment surface comprises a first portion, connected to the first abutment wall and extending along a first plane parallel to the longitudinal direction and parallel to the transverse direction for the entirety of the first portion, and a second portion, connected to the first portion and to the second abutment wall, the second portion extending along a second plane parallel to the transverse direction and inclined with respect to the longitudinal direction so that the second portion is at an increasingly larger distance from the bottom wall, along the longitudinal direction from the first portion to the second abutment wall,
    wherein the first portion of the abutment surface has a longitudinal length greater than 30% of the working distance,
    a switch element, including an inclined wall extending from a first end to a second end and having a first portion and a second portion, located between the first end and the second end so that the first portion is connected to the first end and the second portion is connected to the second end, the switch being removably connectably to the body, so that
      in a first position, the switch element is located in a connecting zone of the body longitudinally interposed between the first abutment wall and the second abutment wall, with the first end proximal to the first abutment wall and the second end proximal to the second abutment wall, the inclined wall being configured to come into contact with the wheel rim, wherein, with the switch located in the connecting zone, the first portion and the second portion of the switch element extends along the longitudinal direction, so that a ratio between the longitudinal length of the first portion and the second portion of the switch element is different than a ratio between the longitudinal length of the first portion and the second portion of the abutment surface, and
      in at least a second position, the switch element is removed from the abutment surface of the body and it is on the outside of the connecting zone.

* * * * *